Sept. 17, 1968  G. L. BRODMANN  3,402,070
BINDER-LUBRICANT FOR FIBER BATTS
Filed Jan. 11, 1966
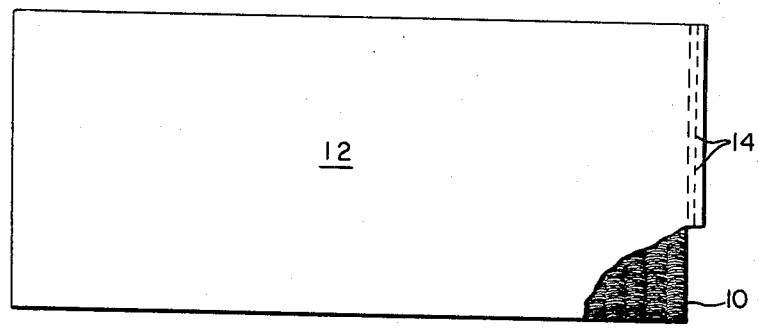
INVENTOR
GEORGE L. BRODMANN
BY *Carl A. Hechmer*
ATTORNEY

United States Patent Office

3,402,070
Patented Sept. 17, 1968

3,402,070
BINDER-LUBRICANT FOR FIBER BATTS
George L. Brodmann, Arden, Wilmington, Del., assignor to E. I. du Pont de Nemours and Company, Wilmington, Del., a corporation of Delaware
Continuation-in-part of application Ser. No. 417,273, Dec. 10, 1964. This application Jan. 11, 1966, Ser. No. 519,994
7 Claims. (Cl. 117—138.8)

ABSTRACT OF THE DISCLOSURE

A synthetic fiber batt for cushioning and insulating articles is rendered refluffable by treating the batt with from 0.8% to about 5% of a binder lubricant comprising a cross-linked mixture of methylpolysiloxane and an acrylic resin. The weight ratio of polysiloxane to resin can vary from 2:1 to 1:3.

---

This application is a continuation-in-part of U.S. Ser. No. 417,273, filed Dec. 10, 1964.

This invention relates to cushioning and insulating articles and more specifically to resilient and high-bulk materials suitable for filling such articles, and particularly to such materials comprising synthetic organic polymer filaments.

In the manufacturing of pillows from synthetic staple fibers it is common practice to process the fibers into the form of a low-density web on a garnett and then cross-lap the web on a moving apron to build a batt of the desired thickness. A suitable length of such a batt is then rolled and inserted into a pillow ticking. Such batts gradually compress or matt on repeated use, and the lost bulk cannot be restored by the common practice of fluffing.

In accordance with the present invention a batt structure, the lost bulk of which can be restored by fluffing, is provided by spraying a batt of a cross-lapped uncompressed web of crimped, staple synthetic fibers, in which web the majority of the fibers are substantially aligned axially along the axis of the web, with an aqueous emulsion of a binder-lubricant mixture comprising a cross-linked polysiloxane and an acrylic resin and drying the sprayed web to remove the water, preferably by application of heat, which simultaneously cross-links the polysiloxane and the resin. Sufficient binder-lubricant is applied to provide from about 0.8% to about 5.0% of dried binder-lubricant based on the weight of the web. A binder-lubricant emulsion containing a weight ratio of polysiloxane to acrylic resin of from about 2:1 to about 1:3 is used. For pillow manufacture from polyester fiber, a final structure having a density of from about 3.2 to about 6.4 is particularly desirable.

Preferably the polysiloxane is an organopolysiloxane mixture consisting of, by weight, (1) from about 10 to about 15% methylhydrogenpolysiloxane, (2) from about 15 to about 20% dimethylpolysiloxane and (3) from about 70 to about 75% of a block copolymer of dimethylpolysiloxane and polyoxyethylene, the block copolymer containing about 28% by weight of dimethylpolysiloxane and about 72% by weight polyoxyethylene.

For the purposes of this invention, methylhydrogenpolysiloxane is a fluid which contains between 1.0 and 1.5 methyl radicals and between 0.75 and 1.0 hydrogen atoms bonded to silicon, per silicon atom in the compound, and the sum of the methyl radicals and the hydrogen atoms ranges from 2.0 to 2.25 per silicon atom. Similarly, dimethylpolysiloxane contains between 2.0 and 2.1 methyl radicals bonded to silicon, per silicon atom in the compound, and has a viscosity, at 25° C., between 1,000 and 100,000 centistokes. The compounds may be end-blocked, preferably with trimethylsiloxy groups. Suitable dimethylpolysiloxane-polyoxyethylene block copolymers are those containing between 15 and 85%, by weight of dimethylpolysiloxane and having a viscosity, at 25° C., of 10 to 3,000 centistokes. Preferably, for hydrolytic stability, the block copolymer will contain no Si—O—C bonds.

The acrylic resin used in conjunction with the polysiloxane is preferably a thermosetting resin. By the term "acrylic resin" is meant a polymer based on an ester of acrylic or methacrylic acid. Amounts up to 25% by weight of other vinyl monomers, e.g., vinyl chloride, may be copolymerized with the ester. Thermosettable acrylic resins are acrylic resins in which functional groups have been introduced along the polymer chain. For example, a carboxyl group can be introduced into the polymer chain by copolymerizing acrylic acid with an acrylate ester. To provide thermosetting action, the polymers are crosslinked as by utilizing an external bifunctional reactant such as, for example, a diepoxide. An even more convenient crosslinking system is the self-crosslinking type which require, at most, heat and a catalyst to bring about crosslinking. Preferred self-crosslinking acrylic resins are those using N-methylolacrylamide in conjunction with lower alkyl acrylates and methacrylates. Such resins using methyl methacrylate will preferably employ about 40 to about 50 percent by weight based on the total weight of the polymer. Other suitable self-crosslinking acrylic resins are described in U.S. 3,157,562.

Batts suitable for the production of pillows can be endowed with down-like aesthetics by the use of a polysiloxane alone. Such batts are, however, difficult to handle in a satisfactory manner on commercial equipment.

With reference to the accompanying drawing, there is shown a plan view of a cushioning article utilizing the filling material of this invention, partially in cross-section composed of a batt of coated, crimped polyester fibers 10 and a fabric covering 12 closed by stitching 14 which goes through the covering at the edges of the cushioning article.

The filaments preferred in the practice of this invention are those made from synthetic organic linear polymers such as nylon, polyacrylonitrile, copolymers of acrylonitrile with other olefinic unsaturated monomers and containing at least 85% by weight combined acrylonitrile and polyesters such as polyethylene terephthalate. Most suitable are filaments which combine a relatively high degree of resistance to bending, stretching, and torsion with the ability to recover substantially from such distortion. The advantages of this invention are also realized using synthetic filaments of regenerated cellulose or cellulose esters or of proteins, but these materials are adversely affected by humidity and repeated compression so that the full advantages of the invention are not attained with these materials.

The novel batts of the present invention are produced by forming a web of crimped polyester staple fibers in which the fibers are substantially axially aligned with the web axis, cross-lapping the web onto a moving apron to form a batt, spraying the batt with the binder-lubricant mixture and passing the treated batt through an oven to cure the mixture. The batt is cut into sections of such a length that it will provide a sufficient mass for filling a pillow ticking in the desired manner. When such a batt section is rolled and inserted in a ticking, a pillow of outstanding aesthetics is obtained. The ticking may be of the down-proof type and can be treated with a fire retardant.

For some purposes, a more desirable product will be obtained if the rolled batt is first encased in a net-type ticking before the batt is inserted in the regular ticking. The net-type ticking may be of a woven, knit, or non-woven fabric. Preferably the net-type ticking will be of a marquisette fabric.

It is desirable to maintain the kind and degree of crimp of the fibers used in the present invention within defined ranges. In describing these preferred ranges, the symbol $L_1$ represents the extended length of the fiber under tension just sufficient to remove the crimp, while the symbol $L_2$ represents the length of the fiber under no tension and in the crimped condition. The symbol I represents the crimp index which is expressed in percentage and is defined by the equation:

$$I = \frac{100(L_1 - L_2)}{L_1}$$

Fibers suitable for this invention must have a crimp index of at least 6 and preferably above 12. When the crimp index is below 6, the finished article becomes matted and firm through continued use and does not show the advantages of this invention. It is also important for purposes of this invention to maintain the number of crimps per inch of length $L_1$ at not less than 4 and preferably above 7. Less than 4 crimps per inch, even at a high crimp index, will not result in a resilient and high-bulk material. The length of the fibers used is of significant importance in determining the properties of the finished article. The utilization of fibers having a length $L_1$ of less than 1 inch results in a loss of bulk and resiliency whereas increasing the length beyond 4 inches causes no significant improvement in the properties of the finished article and lengths beyond 8 inches become difficult to process. Therefore, it is preferred to maintain the fiber lengths between about 2 inches and about 4 inches.

The batts are produced in conventional manner by cross-lapping a web onto a moving apron. Garnetting machines produce webs in which a majority of the fibers are oriented substantially toward the long direction of the continuous web. The moving parts transfer the fibers through the machine unidirectionally and tend to comb or drag the fibers into a parallel configuration. The extent of such orientation depends on the length and character of the fibers, the speed and production rate of the machine, and the design of the machine. Because of the lengthwise parallel orientation of the fibers, the webs show some degree of lengthwise strength but are very weak and split easily in the transverse direction.

Ordinarily, such an oriented web is produced continuously and is folded or cross-lapped on an apron moving across the direction of web delivery, to build up a layered batt containing usually from about two to sixteen layers. Because of the relative motions of web and apron, the successive layers of web cross each other at angles. In general practice, the size of the angle depends somewhat on the width of the batt to be made and the number of web layers desired. The angle formed will generally be in the range of from about 30° to 50° C., the angle being measured with reference to a line perpendicular to the side (edge) of the apron.

If desired, the layers may be of different widths so as to provide a greater quantity of fiber at the center section than at the edge. Such batts will, of course, result in pillows having tapered ends and are a preferred structure. Such tapered batts can be formed by any conventional means. For example, in the cross-lapping, constant long strokes and constant short strokes in a periodic sequence can be utilized. Alternatively, the means used can be to progressively reduce the size of the strokes in a repeat fashion.

The batts will normally be prepared in a width of about 2 feet so as to correspond to the length of a standard-size pillow ticking of 20 x 26 inches. Since machine settings of the garnett have a pronounced effect on the thickness of the web and relatively little effect on the amount of web, batting weights are commonly expressed on a weight per unit of area basis rather than density. For example, a bat weighing 0.8 ounce per square foot may be about 1.5 to 3.0 inches in thickness. Suitable batts for pillows have a weight of about 0.3 to 1.5 ounces per square foot and a density of about 3.2 to 6.4 ounces per cubic foot. Preferably, the batt will have a weight of about 0.4 ounce per square foot and will be about 0.9 to about 1.1 inches in thickness.

The cross-lapped batt is then sprayed with the binder-lubricant. Preferably, the batt is sprayed on one side and passed through an oven to dry the batt and cure the mixture and then sprayed on the other side and passed through the oven a second time. Ideally, the mixture should be applied uniformly throughout the batt, but because the batt acts as a filter, the mixture is applied more heavily at the surface. Because of improved uniformity of penetration, batts of a relatively low density, e.g., less than about 5.5 ounces per cubic foot are preferred structures. The total amount of the mixture applied to the batt is between 0.8 and 5.0%, preferably between 1.0 and 3.0% by weight, based on the weight of the dry batt.

The binder-lubricant is applied to the batt in the form of an aqueous emulsion. In the preferred embodiment the emulsion contains from about two parts to about one-third part by weight of polysiloxane for each part of acrylic resin. Above a polysiloxane to acrylic resin ratio of about 2 to 1 the batt lacks sufficient strength and below a ratio of about 1:3 the batt begins to become rigid. The concentration of the binder-lubricant in the emulsion is not critical. Generally, the concentration chosen will be determined by the nature of the equipment being used and the amount it is desired to apply to the batt. Emulsions containing about 1 to about 20% "solids," by weight, based on the total weight of the emulsion, are suitable.

The mixture may be cured by heating and, preferably, in conjunction with a catalyst. Polysiloxanes containing hydrogen bonded to silicon may be advantageously cured by the use of organic salts of certain reactive metals such as iron, lead, tin and zinc, for example, iron napthenate, zinc octanoate and tin acetate. Curing of the self-cross-linkable acrylic resin may be facilitated by the use of an acidic catalyst such as, for example, oxalic acid or ammonium sulfate.

The bulk durability of a filling material can be determined by laboratory tests which repeatedly compress and release the filling material or by actual use. Laboratory bulk determinations are carried out by using a ticking measuring 20 x 26 inches and filling it with 20 ounces of filling material to form a pillow. The height of the filled pillow, at its center and under 0 load, is then determined. The pillow is then placed in an Instron tester equipped with a load-sensitive table and a 14.3 square inch presser foot. The presser foot is then caused to apply a load of 10 pounds per square inch gauge to the center section of the pillow and the distance between the presser foot and the table recorded as the initial load height (ILH). A loading of 10 pounds is chosen because it approximates the load applied to the pillow under conditions of actual use.

After the initial height (IH) has been determined, the filled structure is submitted to a repeated cycle of compression and load release. Repeat loadings can conveniently be carried out by placing the filled structure on a turntable associated with two pairs of 4 x 12-inch air powered worker feet which are mounted above the turntable in such a fashion that during one revolution essentially the entire contents are subjected to compression and release. Compression is accomplished by powering the worker feet with 80 pounds per square inch gauge air pressure such that they exert a static load of approximately 115 pounds per square inch gauge when in contact with the turntable. The turntable rotates at a speed of 1 revolution per minute and each of the worker feet compresses and releases the filling material 10 times per revolution. After being repeatedly compressed for a specified period of time, the pillow is refluffed by hand. The height of the refluffed pillow is determined and the value recorded as the worked weight (WH). The percent bulk loss is then calculated from the equation $$\text{Percent bulk loss} = 100 \frac{(IH - WH)}{IH}$$

After the worked height has been determined, the pillow is again placed in the Instron and the height under a 10-pound load determined as before and recorded as the worked load height (WLH). The percent load loss (actually the percent bulk loss under load) is then calculated from the equation $$\text{Percent load loss} = 100 \frac{(ILH - WLH)}{ILH}$$

In the examples, all parts and percentages are by weight.

Example 1

Polyethylene terephthalate fibers having a denier of about 4.8 and a length of about 2 inches are stuffer-box crimped so as to have 10.5 crimps per inch. The crimped fibers are processed through a garnett to open them to form a web, and the web is cross-lapped into a batt structure. The batt is approximately 24 inches wide, 1.0 inch in height, and has a density of about 4.8 ounces per cubic foot. The uppermost surface of the batt is then sprayed with a 5% emulsion of a polysiloxane mixture and an acrylic resin. The emulsion contains 0.32% of a tin diacetate/zinc octanoate curing catalyst. The emulsion "solids" consist of 8.5 parts dimethylpolysiloxane, 5.5 parts methylhydrogen-polysiloxane, 36 parts of a polysiloxane/polyoxyethylene block copolymer and 50 parts of a self-crosslinking acrylic resin. The block copolymer contains 28% by weight of dimethylpolysiloxane and 72% by weight of polyoxyethylene and has no significant amount of Si—O—C bonds. The self-crosslinking acrylic resin is prepared by polymerizing a monomer mixture consisting of 46.3% ethyl acrylate, 48% methyl methacrylate, 4.7% N-methylolmethacrylamide and 1% methacrylic acid. The batt is then placed in an oven and dried for 10 minutes at 121.1° C. The other side of the batt is then sprayed and the batt again dried as before. The batt contains about 2.5% by weight of the emulsion "solids."

A section of the batt suitable for providing 20 ounces of fiber is then rolled up and placed into a standard pillow tick having a size of 20 x 26 inches. The pillow is identified as "Pillow A."

Pillows B and C are similarly prepared while pillow D is formed from an unsprayed comparative control batt. However, pillow B is sprayed with a 5% aqueous emulsion of the polysiloxanes alone. The batt gains 2.5% in weight, based on its original weight. The polysiloxane used on pillow C consists of a mixture of 60% dimethylpolysiloxane and 40% methylhydrogenpolysiloxane. All of the pillows are subjected to the previously-described laboratory test for a period of two hours with the results shown in Table I.

TABLE I

|  | A | B | C | D |
|---|---|---|---|---|
| Initial Height | 7.81 | 8.10 | 8.19 | 8.05 |
| Worked Height | 7.27 | 7.14 | 7.20 | 6.32 |
| Percent Bulk Loss | 6.9 | 11.8 | 12.1 | 21.5 |
| Initial Load Height | 2.99 | 2.90 | 2.39 | 2.75 |
| Worked Load Height | 2.49 | 2.44 | 1.60 | 1.75 |
| Percent Load Loss | 16.7 | 15.8 | 33.1 | 36.3 |

When the sprayed batt of pillow A is inserted in a sewn-closed, open mesh polyethylene terephthalate marquisette ticking (60 warp and 36 fillings per inch) which in turn is inserted in a down-proof cotton ticking (104 warp and 76 filling ends per inch, with a zipper closure), the structure is observed to have a 0.27% bulk loss and a 5.8% load loss from an initial height of 7.36 when the durability test is followed by ten tumblings under sterilizing conditions.

Many equivalent modifications of the present invention will be apparent to those skilled in the art from a reading of the above without a departure from the inventive concept.

What is claimed is:

1. A batt of a cross-lapped uncompressed web of crimped, staple synthetic fibers wherein a majority of the said fibers are substantially aligned axially along the axis of the said web, the fibers of said batt bearing from about 0.8% to about 5.0%, based on the weight of the said batt, of a binder-lubricant coating comprising a mixture of a cross-linked polysiloxane and an acrylic resin wherein the weight ratio of polysiloxane to acrylic resin is from about 2:1 to about 1:3.

2. The structure of claim 1 wherein the acrylic resin is cross-linked.

3. The structure of claim 1 wherein the cross-linked polysiloxane is methylhydrogenpolysiloxane.

4. The structure of claim 1 wherein the coating comprises a mixture of an acrylic resin and a polysiloxane composition consisting essentially of from about 10% to about 15% methylhydrogenpolysiloxane, from about 15% to about 20% dimethylpolysiloxane and from about 70% to about 75% of a block copolymer of dimethylpolysiloxane and polyoxyethylene, all percentages based upon the weight of the polysiloxane composition, and wherein the weight ratio of polysiloxane composition to acrylic resin is from about 2:1 to 1:3.

5. The structure of claim 4 wherein the said block copolymer contains about 28% by weight of dimethylpolysiloxane and about 72% by weight of polyoxyethylene.

6. The structure of claim 1 wherein the said synthetic fibers are formed from a polyester.

7. The structure of claim 1 wherein the said acrylic resin is formed from a monomer mixture consisting of about 46% ethyl acrylate, 48% methyl methacrylate, 5% N-methylolmethacrylamide and 1% methacrylic acid.

References Cited

UNITED STATES PATENTS 2,723,935 11/1955 Rodman _____ 117—140 X
2,860,074 11/1958 Hedlund _____ 117—161 X
3,157,562 11/1964 Kine et al. _____ 117—140 X
3,251,794 5/1966 Paliyenko et al. ____ 117—161 X
3,271,189 9/1966 Hofmann _____ 117—161 X WILLIAM D. MARTIN, *Primary Examiner.*

M. R. PERRONE, *Assistant Examiner.*